United States Patent
Park

(10) Patent No.: US 8,514,805 B2
(45) Date of Patent: Aug. 20, 2013

(54) METHOD AND APPARATUS OF PERFORMING HANDOVER USING SUBNET INFORMATION

(75) Inventor: Soo-hong Park, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1218 days.

(21) Appl. No.: 11/623,459

(22) Filed: Jan. 16, 2007

(65) Prior Publication Data

US 2007/0183366 A1 Aug. 9, 2007

Related U.S. Application Data

(60) Provisional application No. 60/765,207, filed on Feb. 6, 2006.

(30) Foreign Application Priority Data

Jun. 27, 2006 (KR) ................. 10-2006-0058070

(51) Int. Cl.
*H04W 4/00* (2009.01)

(52) U.S. Cl.
USPC ........... 370/331; 370/332; 370/333; 370/334; 455/436; 455/437; 455/438; 455/439; 455/442; 455/443; 455/444

(58) Field of Classification Search
USPC ......................................... 455/436; 370/331
See application file for complete search history.

(56) References Cited

U.S. PATENT DOCUMENTS

| | | | |
|---|---|---|---|
| 2003/0125027 A1* | 7/2003 | Gwon et al. ................. 455/436 |
| 2004/0156347 A1 | 8/2004 | Kim | |
| 2004/0253954 A1 | 12/2004 | Lee et al. | |
| 2005/0047372 A1 | 3/2005 | Yano et al. | |
| 2005/0083885 A1 | 4/2005 | Ikeda et al. | |
| 2005/0288022 A1 | 12/2005 | Ryu et al. | |
| 2007/0133463 A1 | 6/2007 | Hori et al. | |

FOREIGN PATENT DOCUMENTS

| | | |
|---|---|---|
| JP | 11-27720 | 1/1999 |
| JP | 2005-27314 | 1/2005 |
| JP | 2005-124087 | 5/2005 |
| JP | 2007-536872 | 12/2007 |
| KR | 2004-70891 | 8/2004 |
| KR | 2005-53141 | 6/2005 |

(Continued)

OTHER PUBLICATIONS

Office Action issued Apr. 17, 2007 by the Korean Intellectual Property Office re: Korean Application No. 2006-58070 (4 pp).

(Continued)

*Primary Examiner* — Justin Lee
(74) *Attorney, Agent, or Firm* — Staas & Halsey LLP

(57) ABSTRACT

A method of performing handover using subnet information includes: comparing subnet information for the current PoA with subnet information for the new PoA; and determining a layer in which handover is performed, according to whether the subnet information for the current PoA is equal to the subnet information for the new PoA, and performing handover in the determined layer. By comparing subnet information received before a mobile node moves with subnet information received after the mobile node moves, and thus quickly determining whether a change between subnets occurs, and by determining a layer in which handover is performed on the basis of the determination result, it is possible to efficiently perform handover.

27 Claims, 3 Drawing Sheets

| Event Id. | MIH Event Type | MIH Event Name | Local(L), Remote(R) | Remote Device |
|---|---|---|---|---|
| 123 | State Change | IP Reconfiguration | L | |

(56) References Cited

FOREIGN PATENT DOCUMENTS

| KR | 10-547112 | 1/2006 |
| WO | 2005/043839 | 5/2005 |
| WO | WO 2005-053187 | 6/2005 |

OTHER PUBLICATIONS

Search Report issued on Apr. 27, 2007 by the International Searching Authority for PCT International Patent Application No. PCT/KR2007/000287.
Chinese Office Action issued Aug. 9, 2011 in corresponding Chinese Patent Application 200780004020.4.
Korean Office Action mailed Oct. 1, 2007 issued in corresponding Korean Patent Application No. 10-2006-0058070.
Chinese Office Action mailed Jul. 4, 2012 issued in corresponding Chinese Patent Application No. 200780004020.4.
Japanese Office Action mailed May 8, 2012 issued in corresponding Japanese Patent Application No. 2008-553150.
Japanese Notice of Reason(s) for Rejection dated Jan. 4, 2012 issued in corresponding Japanese Patent Application No. 2008-553150.
Chinese Office Action mailed Jan. 31, 2013 issued in corresponding Chinese Patent Application No. 200780004020.4.
Chinese Office Action mailed Jun. 7, 2013 in corresponding Chinese Application No. 200780004020.4.

* cited by examiner

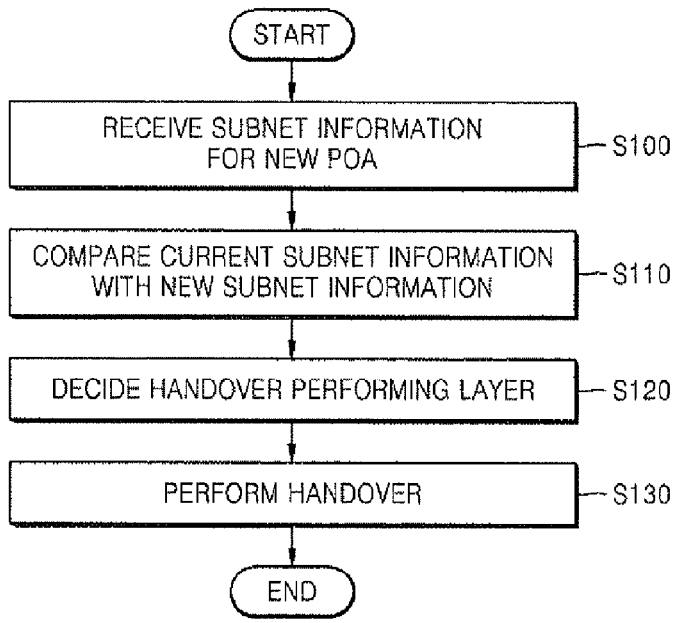

METHOD AND APPARATUS OF PERFORMING HANDOVER USING SUBNET INFORMATION

CROSS-REFERENCE TO RELATED APPLICATIONS

This application claims the benefit of U.S. Provisional Application No. 60/765,207, filed Feb. 6, 2006 in the United States Patent Trademark Office, and of Korean Application No. 2006-58070, filed Jun. 27, 2006, in the Korean Intellectual Property Office, the disclosures of which are incorporated herein by reference.

BACKGROUND OF THE INVENTION

1. Field of the Invention

Aspects of the present invention relate to mobile communication, and more particularly, to a method and apparatus of performing handover in a mobile node using subnet information.

2. Description of the Related Art

Handover in mobile communication is a technique which allows a mobile node to continuously receive a currently used service when the mobile node is moving. In order to perform handover, information for a new network to which a mobile node will move is needed. The information is called "handover information".

The mobile node receives handover information for the network, to which the mobile node will move, from a separate server which is called an information server. The handover information includes information (that is, subnet information) for a subnet to which a Point of Attachment (PoA), to which the mobile node will be connected, belongs. However, no method of determining whether to perform handover in an upper layer and a lower layer directly using such subnet information exists to date. Accordingly, a method of efficiently performing handover using such subnet information is needed.

SUMMARY OF THE INVENTION

Aspects of the present invention provide a method and/or apparatus of efficiently performing handover using subnet information.

Aspects of the present invention also provide a computer readable recording medium storing a computer program for executing the handover performing method.

Additional aspects and/or advantages of the invention will be set forth in part in the description which follows and, in part, will be obvious from the description, or may be learned by practice of the invention.

According to an aspect of the present invention, there is provided a method of performing handover in a mobile node from a current Point of Attachment (PoA) to a new PoA, including: comparing subnet information for the current PoA with subnet information for the new PoA; and determining a layer in which handover is performed, according to whether the subnet information for the current PoA is equal to the subnet information for the new PoA, and performing handover in the determined layer.

According to another aspect of the present invention, there is provided an apparatus for allowing a mobile node to perform handover from a current Point of Attachment (PoA) to a new PoA, including: a subnet information comparator comparing subnet information for the current PoA with subnet information for the new PoA; a layer determining unit determining a layer in which handover is performed, according to whether the subnet information for the current PoA is equal to the subnet information for the new PoA; and a message transmitter transmitting a message for performing handover to the determined layer in which handover is performed.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a flowchart illustrating a handover performing method according to an embodiment of the present invention;

FIG. 5 illustrates a layer 3 handover event according to an embodiment of the present invention; and FIG. 6 illustrates a layer 2 handover command according to an embodiment of the present invention.

DETAILED DESCRIPTION OF THE EMBODIMENTS

Figure 1:
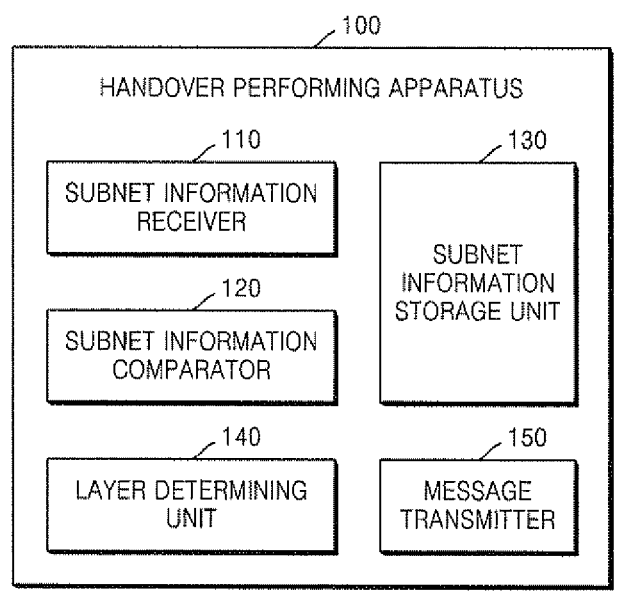
FIG. 1 is a block diagram of a handover performing apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a handover performing apparatus 100 according to an embodiment of the present invention. The handover performing apparatus 100 allows a mobile node to perform handover from a current Point of Attachment (PoA) to a new PoA. In order to allow the mobile node to perform the handover, the shown handover performing apparatus 100 includes a subnet information receiver 110, a subnet information comparator 120, a subnet information storage unit 130, a layer determining unit 140, and a message transmitter 150.

The subnet information receiver 110 receives handover information from an information server. In particular, the subnet information receiver 110 receives subnet information for the new PoA. The received subnet information is transmitted to the subnet information storage unit 130. The subnet information storage unit 130 stores the subnet information. The subnet information comparator 120 compares subnet information for the current PoA with the subnet information for the new PoA received at the receiver 110, and determines whether the two sets of subnet information are the same. The layer determining unit 140 determines a layer in which handover will be performed, according to the comparison result determined at the comparator 120.

The message transmitter 150 transmits a message for performing handover, to the determined layer in which handover will be performed. In order to transmit the message, the message transmitter 150 may include a handover command transmitter (not shown) which transmits a command for performing a layer 2 handover, to a lower layer, and/or a handover event transmitter (not shown) which transmits an event message informing that a subnet is changing and a layer 3 handover must be performed, to an upper layer.

Figure 2:
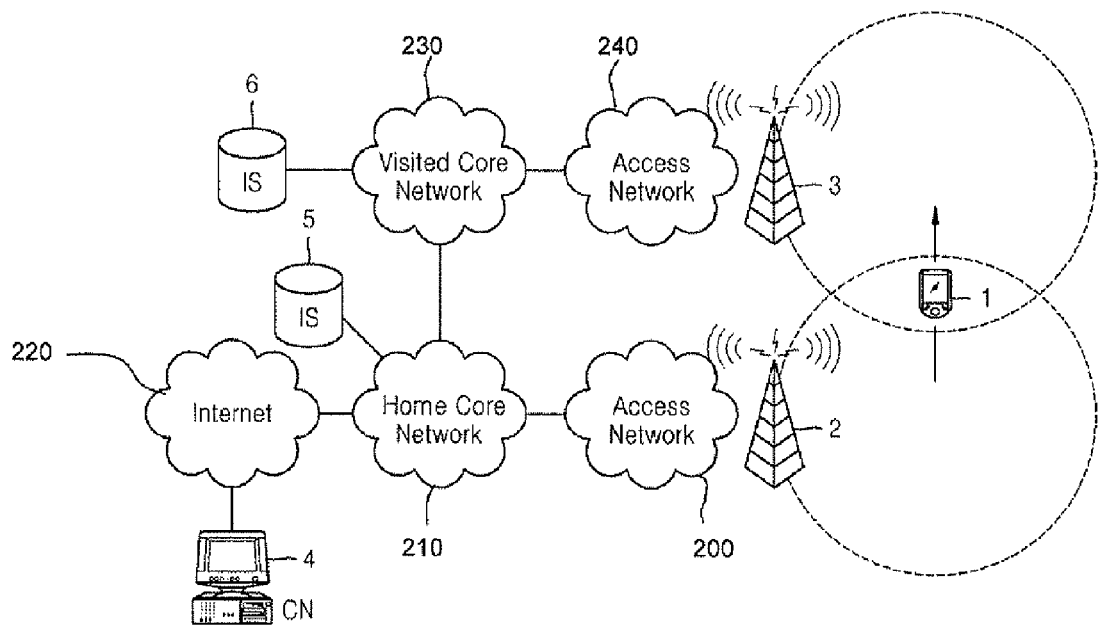
FIG. 2 illustrates a mobile communication environment where handover information is searched for, according to an embodiment of the present invention.

FIG. 2 illustrates a mobile communication environment where handover information is searched for, according to an aspect of the present invention. Referring to FIG. 2, the mobile communication environment is composed of a mobile node 1 (shown as a PDA), PoAs 2 and 3, a correspondent node 4 (shown as a computer), information servers 5 and 6, and a plurality of networks that the nodes 1, 4 can be both mobile, and/or that nodes 1, 4 can be other types of devices. The network topology in the mobile communication environment illustrated in FIG. 2 is intended as being exemplary, and is understood by those of ordinary skill in the art that various other topologies can be constructed. While not required in all aspects, the mobile node 1 can include additional elements used by the mobile node 1, such as a controller and/or display for use in a portable computer, a media player, a PDA, and/or a phone using the network. Moreover, while shown in terms of a mobile node 1 with the node 1 moving relative to stationary PoAs 2, 3, it is understood that there need only be relative motion between the mobile node 1 and the PoAs 2, 3 regardless of which of the node 1 or PoAs 2, 3 are actually in motion.

The mobile node 1 is a mobile terminal using the mobile communication environment. When beginning to use mobile communication, the mobile node 1 registers a home address HoA in a home agent on a home network 210. When the mobile node 1 moves to a different network area that it hasn't been to before, a foreign agent (FA) (which is present on the new network to which the mobile node 1 moves) acquires a care-of address CoA. The mobile node 1 acquires the care-of address CoA, sends the CoA to the home agent, and registers the CoA in the home agent. The home agent allows the care-of address CoA to correspond to the home address, and transmits data to the CoA when data transmission into the HoA is performed in the correspondent node 4 connected to the home node 1 via the internet 220 using the networks 210 and 230.

The FA is an agent which is present on an external network which the mobile node 1 has visited. The mobile node 1 is connected to a current network through a point of attachment (PoA) in the current network area. The PoA is an apparatus for performing data transmission between the mobile node 1 and the network. The PoA includes an Access Point (AP), a base station, etc. However, the present invention is not limited to these, and the PoA can be an arbitrary apparatus for performing data transmission between the mobile node 1 and a network. In the example illustrated in FIG. 2, the PoAs 2 and 3 that are illustrated as base stations are respective PoAs in the corresponding network areas.

When the mobile node 1 moves between PoAs 2, 3, handover must be performed. Also, when the mobile node 1 moves between subnets, handover must be performed. Handover for changing a PoA is called an "L2 handover". The L2 handover is performed in an L2 layer (link layer), under the same subnet environment. Accordingly, when the L2 handover is performed, no change between subnets occurs.

When the mobile node 1 moves between PoAs 2, 3 belonging to different subnets, an L3 handover as well as the L2 handover must be performed. Since the L3 handover is performed in an L3 layer (a network layer) and is performed between different subnets, a change between subnets occurs.

In order to allow the mobile node 1 to perform handover into a new network area, information regarding the new network is required and the information is referred to as "handover information". FIG. 2 illustrates an example in which the mobile node 1 moves to a new network area where data communication is performed using the PoA 3 as a point of attachment, while the mobile node 1 performs data communication in a network area using the PoA 2 as a point of attachment.

The mobile node 1 receives information regarding the new network area through the PoA 2 in the network to which the mobile node 1 belongs before the mobile node 1 moves to the PoA 3. The information, which is an example of the handover information, is received from the information servers 5 and 6 via the home core network 210, a visited core network 230, an access network 200, and the PoA 2. The mobile node 1 acquires information regarding what network protocol is used in the new network area, etc., on the basis of the received information and can perform handover using the acquired information.

One portion of such handover information is subnet information. The subnet information is information regarding a subnet to which the PoA belongs. When the mobile node 1 moves between PoAs belonging to the same subnet, subnet information received from the information server 5 before the mobile node 1 moves will be equal to subnet information received from the information server 6 after the mobile node 1 moves. When the mobile node 1 moves between PoAs belonging to different subnets, the subnet information received from the information server 5 before the mobile node 1 moves will be different from subnet information received from the 6 information server after the mobile node 1 moves. Accordingly, by comparing subnet information received from an information server 5 before the mobile node 1 moves with subnet information received from an information server 6 after the mobile node 1 moves, it can be determined whether a change between subnets occurs.

Also, since it is determined whether to perform L2 handover or L3 handover according to whether a change between subnets occurs, it is possible to quickly determine a layer in which handover is performed. Accordingly, by comparing subnet information received from an information server 5 before the mobile node 1 moves with subnet information received from an information server 6 after the mobile node 1 moves, efficient handover is possible.

Figure 3:
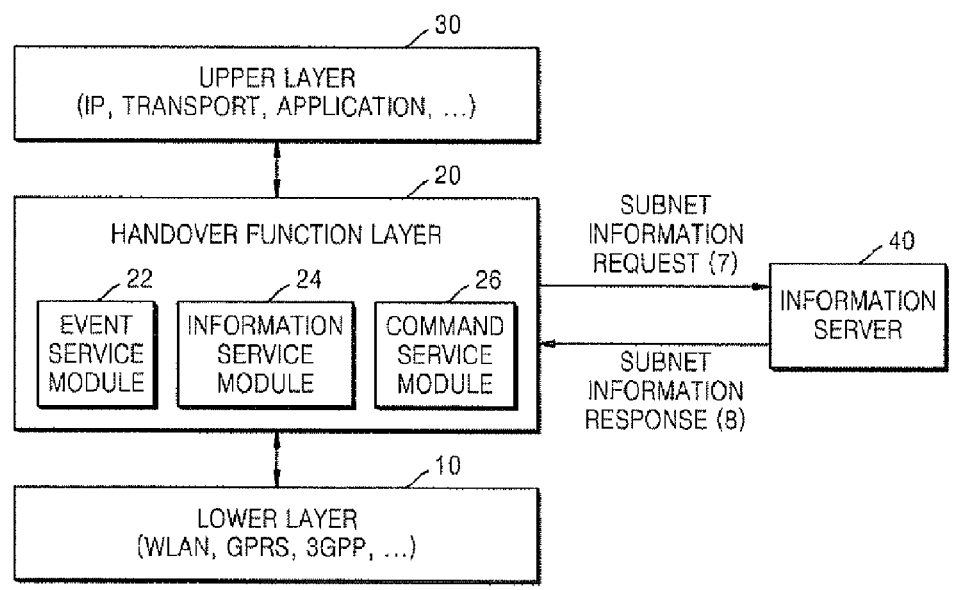
FIG. 3 is a view illustrating network layers of a mobile node, according to an embodiment of the present invention.

FIG. 3 is a view illustrating network layers of a mobile node, according to an embodiment of the present invention. Referring to FIG. 3, the network layers of the mobile node 1 include a lower layer 10, a handover function layer 20, and an upper layer 30. For the convenience of description, an information server 40 is illustrated in FIG. 3.

The lower layer 10 refers to a second layer and the lower layers (that is, a link layer, a physical layer, etc.) of the second layer, among the 7 layers defined by the Open Systems Interconnection (OSI) reference model (ISO/IEC 7498-1:1994 (E)), the disclosure of which is incorporated by reference. The upper layer 30 refers to a third layer and the upper layers (that is, an Internet protocol (IP) layer, a mobile IP layer, a transport layer, an application layer, etc.) of the third layer, among the 7 layers defined by the OSI reference model.

The handover function layer 20 corresponds to a 2.5th layer between the lower layer 10 and the upper layer 30, and supports handover between the lower layer 10 and the upper layer 30. While not required in all aspects, the handover function layer 20 preferably supports handover between different type links, regardless of the type of link interfaces of the lower layer 10. For this handover support, the shown handover function layer 20 includes an event service module 22, an information service module 24, and a command service module 26. However, other modules and/or constructions can be used to achieve like functionality.

The information service module 24 acquires handover information from the information server 40. The information service module 24 corresponds to the subnet information receiver 110 in the embodiment illustrated in FIG. 1. The information service module 24 transmits a message 7 requesting subnet information to the information server 40. The information server 40 transmits a message including subnet information 8 in response to the message 7. The event service module 22 detects an event generated in the mobile node 1, which is related to handover between various links, and notifies the upper layer 30 about the generation of the event. When handover according to an aspect of the present invention is performed, if it is determined that handover in the upper layer is required, the event service module 22 transmits to the upper layer 30 an event message indicating that a subnet is changing and a layer 3 handover must be performed. The event service module 22 corresponds to the handover event transmitter described in the embodiment illustrated in FIG. 1.

The command service module 26 receives a command input by a user from the upper layer 30, thus controlling handover in the lower layer 10. When handover according to an aspect of the present invention is performed, if it is determined that handover into the lower layer 10 is required, the command service module 26 transmits a command for performing a layer 2 handover, to the lower layer 10. The command service module 26 corresponds to the handover command transmitter described in the embodiment illustrated in FIG. 1.

FIG. 4 is a flowchart illustrating a handover performing method according to an embodiment of the present invention. Referring to FIGS. 1 through 4, first, the subnet information receiver 110 receives subnet information for a new PoA from the information server 40 (operation S100). The subnet information comparator 120 compares current subnet information for a current PoA, which is stored in the subnet information storage unit 130 including the subnet information receiver 110, with new subnet information for a new PoA which the subnet information receiver 110 receives (operation S110).

The layer determining unit 140 determines a layer in which handover is performed (operation S120). The layer determining unit 140 uses the comparison result of the subnet information comparator 120 in order to determine the layer. If the current subnet information is equal to the new subnet information, this means that no change between subnets occurs. In this case, an L2 handover corresponding to a case when no change between subnets occurs must be performed. Accordingly, the layer determining unit 140 determines that handover is performed in the lower layer 10.

If the current subnet information is different from the new subnet information, this means that a change between subnets occurs. In this case, an L3 handover corresponding to a case when a change between subnets occurs must be performed. Accordingly, the layer determining unit 140 determines that handover is performed in the upper layer 30.

The message transmitter 150 transmits a message for performing handover to the determined layer in which handover is performed, and allows the corresponding layer to perform handover (operation S130). If it is determined that handover is performed in the upper layer 30, the handover event transmitter transmits to the upper layer 30 an event message indicating that a subnet changes and a layer 3 (L3) handover must be performed. The event message is referred to as a "layer 3 handover event". The upper layer 30, which receives the layer 3 handover event, performs an L3 handover.

If it is determined that handover is performed in the lower layer 10, the handover command transmitter transmits to the lower layer 10 a command for performing a layer 2 (L2) handover. The command is referred to as a "layer 2 handover command". The lower layer 10, which receives the layer 2 handover command, performs an L2 handover.

FIG. 5 illustrates a layer 3 handover event 50 according to an embodiment of the present invention. Referring to FIG. 5, the layer 3 handover event 50 includes an event identifier (ID) field 52, an event type field 54, an event name field 56, and a field 58 for distinguishing "local event" from "remote event", and a field 60 indicating an apparatus to which an event is transmitted in the case of "remote". However, it is understood that additional field can be used in other aspects.

In the example of FIG. 5, a number 123 is assigned to the event ID field 52, however, the present invention is not limited to this. The event type field 54 shows that the corresponding event is an event notifying that a state change occurs in the upper layer 30. The event name field 56 shows that the layer 3 handover event 50 is a message requesting an L3 handover to change a subnet. FIG. 5 illustrates an example of an L3 handover, in which IP reconfiguration is requested. The field 58 for distinguishing "local" from "remote" is used when an event is transmitted to an external device. If the handover performing apparatus 100 is included in the mobile node 1, the field 58 has a value of "local (L)". In this case, the remote device field 60 is in a null state. Conversely, if the message is from another device, the field 58 indicated remote (R), and the device field 60 indicates the device having the handover performing apparatus 100.

FIG. 6 illustrates a layer 2 handover command according to an embodiment of the present invention. Referring to FIG. 6, the layer 2 handover command 70 includes a command number field 72, a link command field 74, a field 76 for distinguishing "local" from "remote", and a field 78 regarding a remote apparatus. It is understood that the fields are not limited to the shown fields and that additional fields can be used.

In FIG. 6, a number 123 is assigned to the command number field 72, however, the present invention is not limited to this. The link command field 74 represents whether a link change occurs in the lower layer 10. The field 76 for distinguishing "local" from "remote" and the remote apparatus field 78 are described above with reference to FIG. 5, and therefore, a detailed description thereof is omitted.

While not required, an aspect of the present invention can be implemented by a computer (including all apparatuses having an information processing function) readable code in a computer readable recording medium. The computer readable recording medium includes all types of recording apparatuses in which data capable of being read by a computer system is stored. The computer readable recording medium may be ROMs, RAMs, CD-ROMs, magnetic tapes, floppy discs, optical data storage devices, etc.

In a handover performing method and apparatus, according to an aspect of the present invention, it is possible to efficiently perform handover by comparing subnet information received before a mobile node moves with subnet information received after the mobile node moves, and thus quickly determine whether a change of subnet occurs, and by determining a layer in which handover is performed on the basis of the determination result.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of performing handover in a mobile node from a current Point of Attachment (PoA) to a new PoA, comprising:

in a handover function layer, receiving subnet information from an information server for the new PoA before a handover in a lower layer is initiated;

in the handover function layer, comparing subnet information for the current PoA with the subnet information for the new PoA;

in the handover function layer, determining a layer selected from a plurality of layers in which a handover is performed, according to whether the subnet information for the current PoA matches the subnet information for the new PoA and sending a message for the handover to the determined layer before initiating a handover in the lower layer; and performing the handover in the determined layer, wherein performing of the handover in an upper layer comprises:

transmitting an event message to the upper layer, having an event name field indicating that there is a change of subnet via a layer 3 (L3) handover to be performed and an event type field indicating that a state change is to occur in the L3 layer; and performing the layer 3 (L3) handover in the upper layer.

2. The method of claim 1, further comprising receiving the subnet information for the new PoA from an information server.

3. The method of claim 1, wherein the determining of the layer comprises:

if the subnet information for the current PoA is equal to the subnet information for the new PoA, performing the handover in the lower layer; and if the subnet information for the current PoA is different from the subnet information for the new PoA, performing a handover in an upper layer.

4. The method of claim 3, wherein the handover performed in the lower layer is a layer 2 (L2) handover.

5. The method of claim 4, wherein the performing the handover in the lower layer comprises:

transmitting a command to initiate performing the layer 2 handover to the lower layer; and performing the layer 2 handover in the lower layer.

6. The method of claim 3, wherein the handover performed in the upper layer is a layer 3 (L3) handover.

7. An apparatus for allowing a mobile node to perform handover from a current Point of Attachment (PoA) to a new PoA, comprising:

a subnet information receiver receiving subnet information from an information server for the new PoA before a handover in a lower layer is initiated;

a subnet information comparator comparing subnet information for the current PoA with the subnet information for the new PoA;

a layer determining unit determining a layer selected from a plurality of layers in which a handover is performed, according to whether the subnet information for the current PoA matches the subnet information for the new PoA and sending athe message for the handover to the determined layer before initiating the handover in the lower layer; and a message transmitter transmitting a message for performing the handover to the determined layer in which handover is performed, wherein performing of the handover in an upper layer comprises:

transmitting an event message to the upper layer, having an event name field indicating that there is a change of subnet via a layer 3 (L3) handover to be performed and an event type field indicating that a state change is to occur in the L3 layer; and performing the layer 3 (L3) handover in the upper layer.

8. The apparatus of claim 7, further comprising a subnet information receiver receiving the subnet information for the new PoA from thean information server.

9. The apparatus of claim 7, wherein the layer determining unit determines that handover is performed in the lower layer, if the subnet information for the current PoA matches the subnet information for the new PoA, and determines that handover is performed in an upper layer, if the subnet information for the current PoA is different from the subnet information for the new PoA.

10. The apparatus of claim 9, wherein the handover performed in the lower layer is a layer 2 (L2) handover.

11. The apparatus of claim 9, wherein the handover performed in the upper layer is a layer 3 (L3) handover.

12. The apparatus of claim 9, wherein the message transmitter comprises:

a handover command transmitter for to transmit a command to initiate performing a layer 2 handover to the lower layer, if it is determined that the handover is performed in the lower layer; and a handover event transmitter transmitting an event message to the upper layer, notifying that there is a change of subnet and layer 3 handover has to be performed, if it is determined that the handover is performed in the upper layer.

13. A non-transitory computer readable recording medium having embodied thereon a computer program for executing a handover performing method performed by a computer, the method comprising:

in a handover function layer, receiving subnet information from an information server for a new (Point of Attachment) (PoA) before a handover in a lower layer is initiated;

in the handover function layer, comparing subnet information for a current Point of Attachment (PoA) of a mobile node with the subnet information for a new PoA of the mobile node; and in the handover function layer, determining a layer selected from a plurality of layers in which a handover is performed and performing the handover, according to whether the subnet information for the current PoA matches the subnet information for the new PoA, sending a message for the handover to the determined layer before initiating the handover in the lower layer and performing handover in the determined layer, wherein performing of the handover in an upper layer comprises:

transmitting an event message to the upper layer, having an event name field indicating that there is a change of subnet via a layer 3 (L3) handover to be performed and an event type field indicating that a state change is to occur in the L3 layer; and performing the layer 3 (L3) handover in the upper layer.

14. A method of performing handover in a mobile node, comprising:

in a handover function layer, receiving subnet information from an information server for a new Point of Attachment (PoA) before a handover in a lower layer is initiated;

in the handover function layer, comparing the received subnet information received at the mobile node with stored subnet information stored in the mobile node;

performing a lower layer handover at the lower layer of the mobile node; and in the handover function layer, sending a message for handover to an upper layer of the mobile node before the handover in the lower layer is initiated and performing an upper layer handover at the upper layer of the mobile node where the received subnet information does not match the stored subnet information, wherein performing of the handover in the upper layer comprises:

transmitting an event message to the upper layer, having an event name field indicating that there is a change of subnet via a layer 3 (L3) handover to be performed and an event type field indicating that a state change is to occur in the L3 layer; and performing the layer 3 (L3) handover in the upper layer.

15. The method of claim 14, further comprising receiving at the mobile node the received subnet information from the information server for another point of attachment which is other than a point of attachment for the stored subnet information.

16. The method of claim 15, retrieving the stored subnet information from a memory of the mobile node.

17. The method of claim 14, wherein:
the performing the lower layer handover comprises performing a layer 2 handover in the mobile node, and
the performing the upper layer handover comprises performing a layer 3 handover in the mobile node.

18. The method of claim 14, wherein:
the lower layer is a second layer as defined by the Open Systems Interconnect (OSI) reference model, and
the upper layer is a third layer as defined by the Open Systems Interconnect (OSI) reference model.

19. The method of claim 14, wherein the performing the lower layer handover comprises issuing a layer 2 handover command including:
a first field with an instruction to perform a link change, and
a second field which is configured to indicating whether the link command is to be implemented at a local apparatus when in a first state and at a remote apparatus when in a second state.

20. The method of claim 14, wherein the performing the upper layer handover comprises issuing a layer 3 handover command including:
a first field which identifies the command as being for a state change at the upper layer;
a second field which identifies a type of the state change to be performed at the upper layer; and
a third field which is configured to indicating whether the state change is to be implemented at a local apparatus when in a first state and at a remote apparatus when in a second state.

21. The method of claim 20, wherein the second field indicates the type of state change to be an IP reconfiguration.

22. A mobile wireless apparatus, comprising:
a transmitter/receiver to transmit and receive wireless data with respect to one or more external networks and to receive subnet information from an information server before a handover in a lower layer is initiated;
a memory to store subnet information; and
a handover layer performing unit to compare the received subnet information with the stored subnet information, to perform a lower layer handover at the lower layer of the mobile, to send a message for handover to an upper layer of the mobile apparatus before initiating a handover in the lower layer and to perform an upper layer handover at the upper layer of the mobile apparatus where the received subnet information does not match the stored subnet information,
wherein performing of the handover in the upper layer comprises:
transmitting an event message to the upper layer, having an event name field indicating that there is a change of subnet via a layer 3 (L3) handover to be performed and an event type field indicating that a state change is to occur in the L3 layer; and
performing the layer 3 (L3) handover in the upper layer.

23. The mobile wireless apparatus of claim 22, wherein the received subnet information is received through the transmitter/receiver from the information server for another point of attachment which is other than a point of attachment for the stored subnet information.

24. The mobile wireless apparatus of claim 23, wherein:
the lower layer handover is a layer 2 handover, and
the upper layer handover is a layer 3 handover.

25. The mobile wireless apparatus of claim 22, wherein the handover layer performing unit issues a layer 2 handover to the lower layer using a command including:
a first field with an instruction to perform a link change, and
a second field which is configured to indicating whether the link command is to be implemented at a local apparatus when in a first state and at a remote apparatus when in a second state.

26. The mobile wireless apparatus of claim 22, wherein the handover layer performing unit issues a layer 3 handover command to the upper layer using a command including:
a first field which identifies the command as being for a state change at the upper layer;
a second field which identifies a type of the state change to be performed at the upper layer; and
a third field which is configured to indicating whether the state change is to be implemented at a local apparatus when in a first state and at a remote apparatus when in a second state.

27. The mobile wireless system comprising:
a first point of attachment (PoA) connected to a first information server storing first subnet information;
a second point of attachment (PoA) connected to a second information server storing second subnet information; and
a mobile apparatus having:
a receiver which receives wireless data including the second subnet information transmitted from the second information server while moving between the first and second POA before a handover in a lower layer is initiated;
a memory to store the first subnet information; and
a handover layer performing unit to compare the received second subnet information with the stored first subnet information, to perform a lower layer handover at the lower layer of the mobile apparatus, to send a message for handover to an upper layer of the mobile apparatus before the handover in the lower layer of the mobile apparatus is initiated, and to perform an upper layer handover at the upper layer of the mobile apparatus where the received second subnet information does not match the stored first subnet information,
wherein performing of the handover in the upper layer comprises:
transmitting an event message to the upper layer, having an event name field indicating that there is a change of subnet via a layer 3 (L3) handover to be performed and an event type field indicating that a state change is to occur in the L3 layer; and
performing the layer 3 (L3) handover in the upper layer.

* * * * *

UNITED STATES PATENT AND TRADEMARK OFFICE
CERTIFICATE OF CORRECTION

PATENT NO.         : 8,514,805 B2                                                    Page 1 of 1
APPLICATION NO.    : 11/623459
DATED              : August 20, 2013
INVENTOR(S)        : Soo-Hong Park It is certified that error appears in the above-identified patent and that said Letters Patent is hereby corrected as shown below:

In the Specifications
In Column 1, Line 9, Delete "60/765/207" and insert -- 60/765,207 --, therefor.
In Column 1, Line 10, After "Patent" insert -- and --.

In the Claims
In Column 7, Line 54, In Claim 7, Delete "athe" and insert -- a --, therefor.
In Column 8, Line 3, In Claim 8, Delete "thean" and insert -- the --, therefor.
In Column 8, Line 17, In Claim 12, After "transmitter" delete "for".

Signed and Sealed this
Fourth Day of February, 2014

Michelle K. Lee
*Deputy Director of the United States Patent and Trademark Office*